Sept. 16, 1924.  
W. J. BINGEN ET AL  
1,508,500

CARRIAGE ROCKING DEVICE

Original Filed Feb. 3, 1922  4 Sheets-Sheet 1

W. J. Bingen
H. W. Olsen
INVENTORS

BY Victor J. Evans
ATTORNEY

WITNESS:

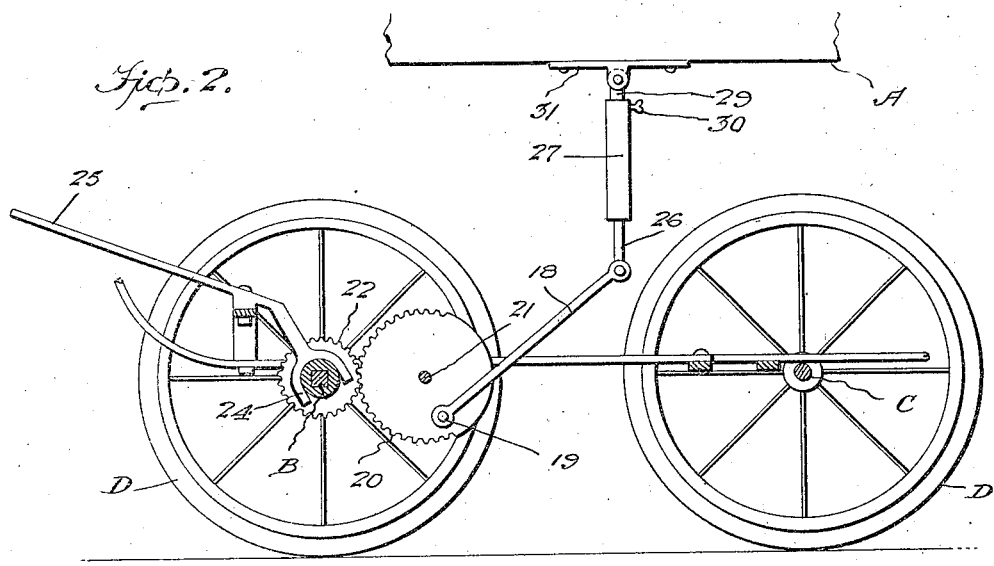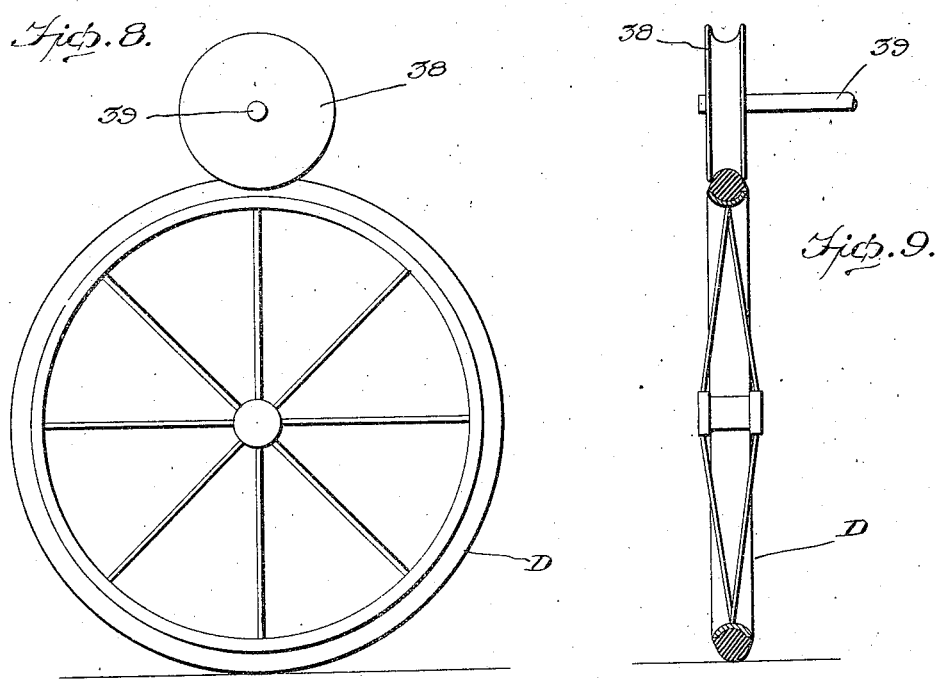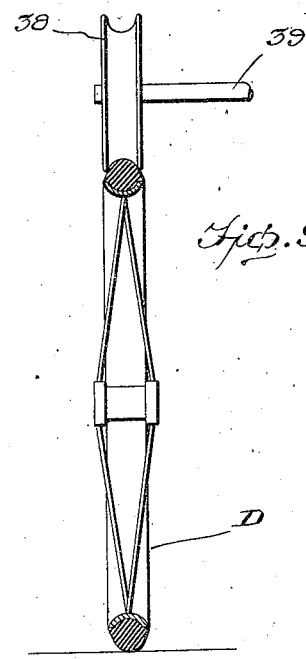

Sept. 16, 1924.  1,508,500
W. J. BINGEN ET AL
CARRIAGE ROCKING DEVICE
Original Filed Feb. 3, 1922    4 Sheets-Sheet 3
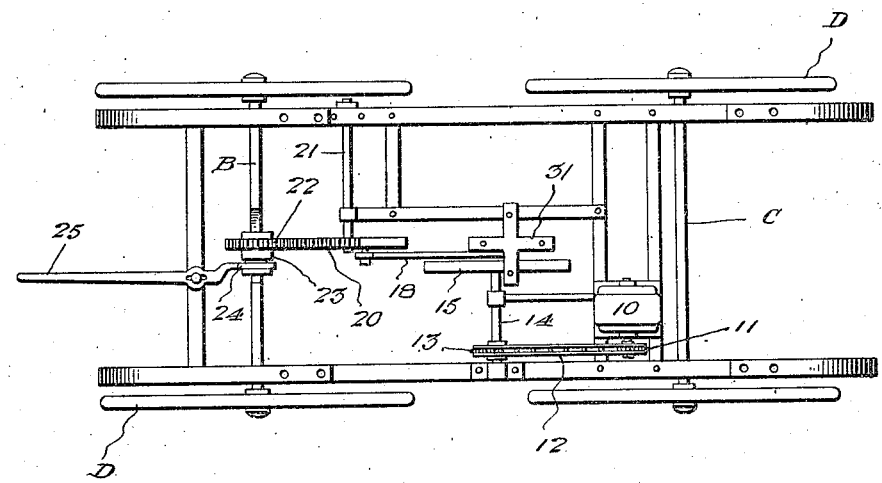
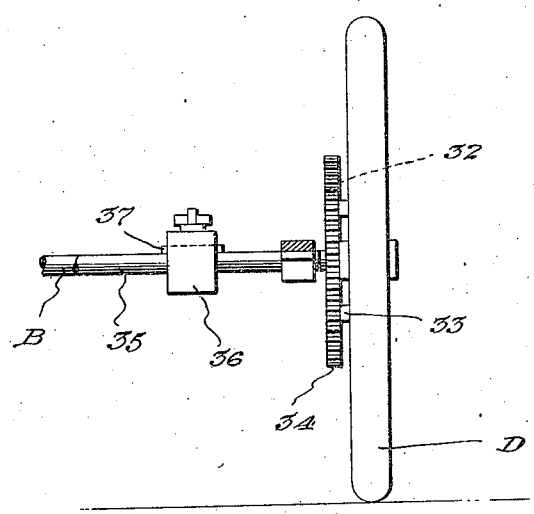
W. J. Bingen
H. W. Olsen INVENTORS
BY Victor J. Evans
ATTORNEY
WITNESS: Paul M. Hunt Sept. 16, 1924.  
W. J. BINGEN ET AL  
1,508,500  
CARRIAGE ROCKING DEVICE  
Original Filed Feb. 3, 1922  4 Sheets-Sheet 4

W. J. Bingen
H. W. Olsen
INVENTORS

BY Victor J. Evans
ATTORNEY

WITNESS:
Paul W. Hunt

Patented Sept. 16, 1924.

1,508,500

UNITED STATES PATENT OFFICE.

WILLIAM JOSEPH BINGEN AND HARRY WILLARD OLSEN, OF LARIMORE, NORTH DAKOTA.

CARRIAGE-ROCKING DEVICE.

Application filed February 3, 1922, Serial No. 533,997. Renewed February 9, 1924.

*To all whom it may concern:*

Be it known that we, WILLIAM JOSEPH BINGEN and HARRY WILLARD OLSEN, citizens of the United States, residing at Larimore, in the county of Grand Forks and State of North Dakota, have invented new and useful Improvements in Carriage-Rocking Devices, of which the following is a specification.

This invention relates to devices for moving baby carriages and the like, and has for its object the provision of a novel power driven mechanism designed for association with a baby carriage, lullaby, wheeled crib or other similar device of a type designed for caring for infants, whereby the carriage or other device may be caused to travel back and forth and be caused to rock up and down, either of these movements being capable of being effected regardless of the other movement or both being capable of being carried out simultaneously.

An important object is the provision of a mechanism of this character which is so constructed that the lengths of travel or distance traversed by the carriage or other similar vehicle may be varied so that the device may be used within large or small rooms, the mechanism furthermore including means whereby the degree of the up and down movement of the carriage may be varied or whereby either or both of the movements may be discontinued at will.

Another object is the provision of a device of this character which is adapted for association with carriages of different types, for instance those in which the axles are stationary and the wheels rotate thereupon and those in which the axles rotate.

Another object is the provision of novel means whereby the device may be connected or associated with the running gear of a carriage which is already in existence as well as being capable of being built into a carriage during the manufacture thereof.

Still another object is the provision of novel clutch mechanism which is associated with the driving device whereby any or all of the moving parts may be caused to come to rest and be inoperative.

An additional object is the provision of a mechanism of this character which will be comparatively simple and inexpensive in manufacture, highly efficient in use, easy to control, positive in action, durable in service and a general improvement in the art.

With the above and other objects and advantages in view, the invention consists in the details of construction to be hereinafter more fully described and claimed, and illustrated in the accompanying drawings in which, Figure 1 is a side elevation of a carriage equipped with one form of the invention.

Figure 2 is a longitudinal sectional view therethrough.

Figure 3 is a plan view showing the carriage body removed.

Figure 7 is a cross-sectional view therethrough.

Figure 8 is a side elevation of still another modified form of the device.

Figure 9 is a cross-sectional veiw therethrough.

Figure 1:
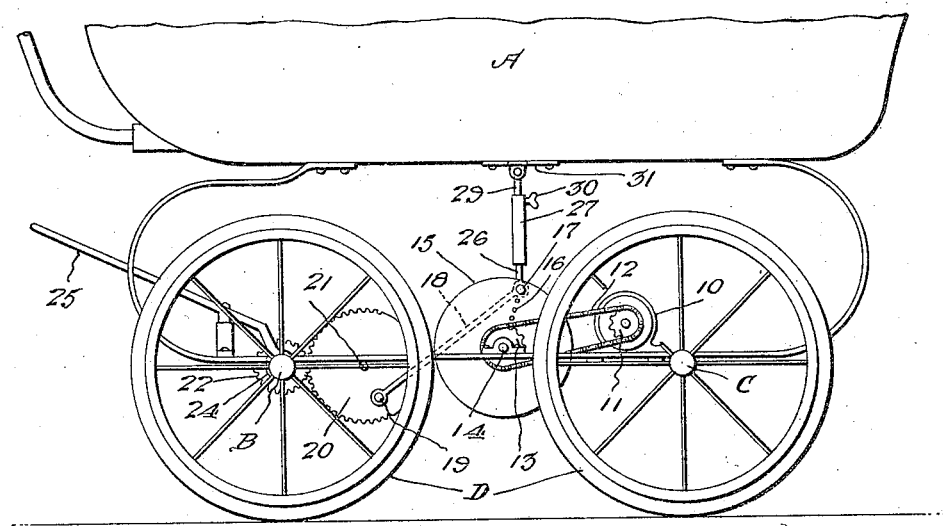
Figure 5:
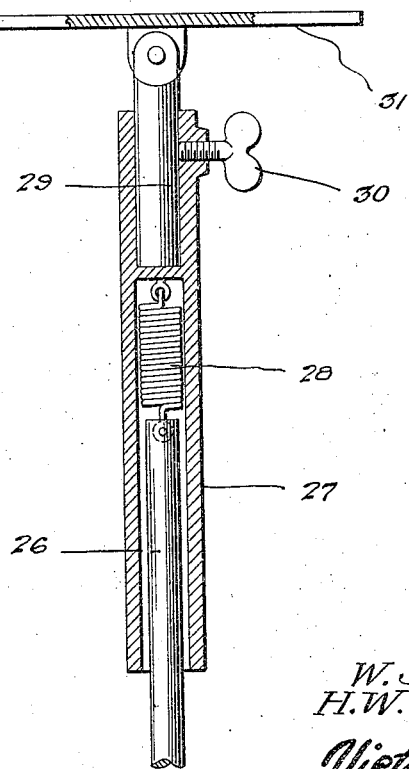
Figure 5 is an enlarged detail longitudinal sectional view showing the adjusted means for rocking the carriage.
Figure 4:
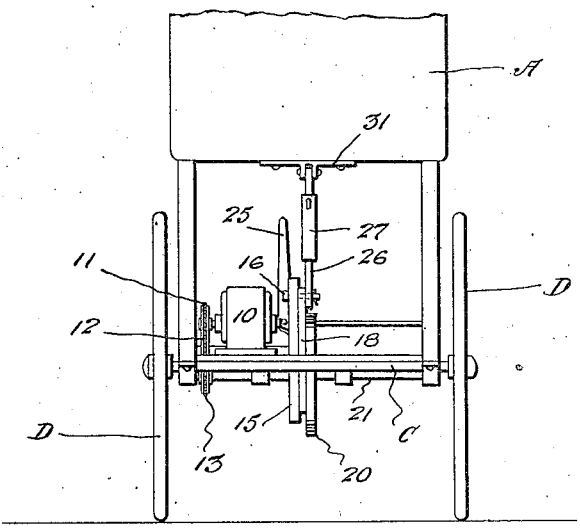
Figure 4 is an end elevation.
Figure 6:
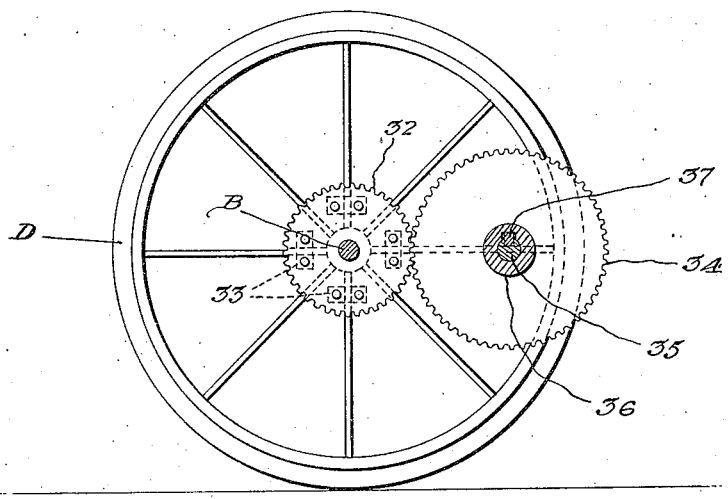
Figure 6 is a longitudinal sectional view through a modified form of the device.

Referring more particularly to the drawings the letter A designates the body of a baby carriage or other vehicle, B designates one axle thereof, C designates the other axle and D designates the wheels which are mounted upon the axles. The carriage illustrated is of the type in which the wheels are rigidly secured upon the axles, the axles being of course suitably mounted for rotation within any preferred type of bearings such as are commonly provided.

In carrying out the invention we provide a suitable power device which is herein illustrated as being an electric motor 10 suitably mounted with respect to the carriage running gear and having its shaft provided with either a belt or a sprocket 11 about which is trained a chain 12 or a belt as the case might be, this sprocket being in turn trained about a sprocket 13 secured upon a counter shaft 14 suitably journaled on the running gear of the carriage or other vehicle. This shaft 14 carries either the disk 15 or else a crank arm which is provided throughout with a series of radially aligned holes 16 within any one of which may be engaged a bolt or pivot pin 17 which is provided at one end of a pitman 18 which has its other end connected with an eccentric pin 19 carried by a segmental gear 20 mounted upon a suitable shaft 21 properly journaled in any preferred bearings upon the running gear of the carriage or other vehicle. Slidably mounted upon the squared intermediate portion of one of the carriage axles C is a gear 22 which meshes ordinarily with the segmental gear 20 and which carries a grooved collar 23 which is engaged by the forked end 24 of a shifting lever 25 which is suitably mounted upon the running gear of the carriage. It is understood of course that one or both of the wheels associated with the axle C is rigid with respect to the axle.

The carriage rocking mechanism consists of an arm 26 which is connected with the pivot pin 17 and which of course moves therewith and which carries upon its free end a tubular socket member 27 within which is disposed a coil spring 28 which is engaged by the upper end of the arm 26. The other end of the socket member 27 is formed with a socket into which is engaged a rod 29 adapted to be held at any desired location by means of a set of suitable set screws 30 and which has its upper end carrying a cross head 31 which is engageable with the bottom of the carriage body A.

In the operation of this form of the device it will be seen that the pivot pin 17 may be disposed within any one of the holes 16 in the disk 15 so as to vary the throw or movement of the pitman 18 and so as to vary the consequent angular rotation of the segmental gear 20. When the motor is in operation and the disk 15 is being rotated, it will of course be apparent that the pitman 18 associated therewith will have the essential movement necessary and that this movement will be transmitted to the eccentric pin 19 carried by the segmental gear 20 so that the latter will be rotated back and forth. Owing to the rotation of this segmental gear it will be quite apparent that the pinion or gear 20 meshing therewith and splined or slidable but not rotatable upon the axle G will cause rotation of the axle C and consequent movement of the carriage wheels carried thereby so that the carriage will be moved back and forth. Owing to the particular arrangement it will be seen that the segmental gear will have merely an oscillatory movement back and forth while the disk 15 has a continuous rotation or movement. It is of course apparent that the rotation of the axle C on account of the segmental gear meshing with the pinion thereon will result in back and forth movement of the carriage.

While the carriage is being thus reciprocated back and forth, it will be apparent that the movement of the disk 15 and the pivot pin 17 carried thereby will cause up and down movement of the arm 26 with which is associated the socket member 27 which carries the rod 29 adapted for engagement with the bottom of the carriage. As this arm 26 has an up and down movement during the rotation of the disk it will be readily apparent that the bottom of the carriage will be pushed upwardly and then return gravitationally downwardly so that an efficient rocking motion will be provided. It is of course apparent that the carriage might be supported entirely by the cross-head member 31 carried by the upper end of the rod 29 but it is preferable that one end of the carriage body be pivotally mounted and that the swinging up and down movement will be provided. It is to be observed that the provision of the spring 28 within the socket member is an important point for the reason that it cushions the shock so that there will be no abrupt movement of the carriage but merely a gradual swinging up and down movement which will tend to soothe the infant within the carriage. It is also to be noted that the set screw 30 provides means for adjustment and provides means whereby the parts may be rigidly secured together.

In case it should be desired to rock the carriage back and forth without effecting up and down movement of the body thereof, it is merely necessary that the socket member 27 be so adjusted that when the cross head 31 is in its uppermost position it will not engage against the bottom of the carriage so that any possible movement of the latter will be prevented. Another important feature is the fact that when the control lever 25 is moved to one side so that the forked end thereof engaging within the collar 23 will move the gear 22 out of engagement with the segmental gear 20 the drive mechanism of the carriage will become inoperative so that the carriage will remain in stationary position while the up and down rocking movement of the carriage body many continue without involving any travel of the carriage itself upon the floor of the room or other place. In this way it will be readily observed that the carriage may be caused to have the back and forth movement or may be caused to have this movement simultaneously with the up and down movement or that either one alone may be used.

While it is desirable that the motor device for driving the mechanism be an electric motor adapted to be driven from one of the sockets in the electric wiring or lighting system of the house or room in which the carriage is designed to be used, it is of course apparent that the carriage might carry a storage battery which might be connected with the motor of the drive mechanism so that the entire mechanism would be self contained and might be a separate entity which might be manufactured and sold for attachment to already existing carriages. If desired any suitable spring motor may be provided instead of an electric motor. It is of course to be observed that by disposing the pivot pin 17 in different ones of the holes 16 the throw of the pitman 18 may be regulated so as to vary the degree of travel of the carriage back and forth.

In the second form of the invention the construction is substantially the same except that the mechanism is designed to be associated with carriages of that type in which the wheels themselves are rotatable upon spindles formed upon the ends of rigid axles. In this form the gear 32 which corresponds with the gear 22 of the previously described form is rigidly secured to one of the carriage wheels by means of suitable clips or clamps 33, and is in mesh with a gear 34 which corresponds with the gear 20 but which is slidable upon its supporting shaft 35 by means of the grooved collar and clutch mechanism indicated by the numerals 36 and 37 respectively whereby disengagement may be effected, this clutch mechanism being in correspondence with the grooved collar and lever shifting mechanism of the previously described form. The operation of this form of the device is the same as that of the previously described form except that instead of shifting the gear which is upon the axle carrying the wheels of the first described form the inoperative throwing mechanism is slightly different. In this form the device is thrown into inoperative position by shifting the gear 34 upon its shaft 35 so as to effect disconnecting of the drive mechanism.

In some instances it may not be practical to arrange the drive mechanism as above described or for some reason it may be preferred to use a different drive mechanism which we have shown in the remaining figures of the drawing. In this last remaining form, we provide a relatively small wheel 38 which is suitably journaled at one side of the carriage and which has its face or edge concaved for driving engagement with one of the wheels of the carriage. Owing to the fact that baby carriage wheels are usually provided with rubber tires it is quite apparent that the wheel 38 will have an efficient driving action and will not slip with respect to the carriage wheel. The wheel 38 is of course mounted upon a shaft 39 which may be driven by any suitable power device. It is of course obvious that the operation of this form is substantially the same as that of the first described form, the only difference being in the mode of transmitting the power to the carriage wheel. It is also to be noted that there may be any preferred clutch mechanism or shifting lever associated with this roller or wheel 38 whereby the drive connection may be rendered inoperative at will.

From the foregoing description and a study of the drawings it will be apparent that we have thus provided a comparatively simple and consequently inexpensive drive mechanism whereby a baby carriage may be rolled back and forth or whereby it may be given an up and down rocking motion so as to pacify and soothe the infant disposed therein. It is of course to be understood that the electric motor which furnishes the power may be driven from a storage battery or the like mounted directly upon the running gear of the carriage or it may derive its power from an ordinary electric light socket from the room in which it is placed. It will be observed that we have provided ample means for varying the up and down movement of the carriage or for eliminating the up and down movement and confining the action to merely back and forth rolling of the carriage. It will also be observed that ample adjustment is provided whereby to vary the distance which will be traversed by the carriage at the stroke so that it will be well adapted for use in very small as well as in large rooms. The use of a spring motor as the drive element has already been mentioned.

While we have shown and described the preferred embodiment of the invention it is of course to be understood that we reserve the right to make such changes in the form, construction and arrangement of parts as will not depart from the spirit of the invention or the scope of the subjoined claims.

Having thus described the invention we claim;

1. An attachment for baby carriages comprising a motor mounted on the carriage frame, a pinion on one axle which has a pair of wheels secured thereto, the axle being rotatable through the frame, an intermediate segmental gear journaled on the frame and meshing with said pinion, a disk journaled on the frame, means for driving said disk from the motor, a pitman pivotally connected with the disk and with said segmental gear, and an arm member pivotally connected with the bottom of the carriage body and with said disk, whereby the carriage will be moved back and forth simultaneously with up and down movement of the body thereof.

2. A device of the character described comprising a rotary drive member, means for driving said member, a wheel connected with said drive member and provided with a series of holes, a pitman adjustably connected with one of said holes, an arm connected with said pitman at its pivot point and extending upwardly, a socket member carried by said arm, a member carried by the socket member in adjustable relation thereto and engageable with the bottom of a baby carriage, a segmental gear, and eccentric pin on said segmental gear and connected with said pitman, and a pinion associated with one of the wheels of the carriage and meshing with said segmental gear.

3. An attachment for baby carriages comprising a motor mounted on the carriage frame, a pinion on one axle which has a pair of wheels secured thereto, the axle being rotatable through the frame, an intermediate segmental gear journaled on the frame and meshing with said pinion, a disk journaled on the frame; means for driving said disk from the motor and a pitman pivotally connected with the disk and with said segmental gear, and an arm member pivotally connected with the bottom of the carriage body and with said disk at the point of connection of the pitman therewith, and shock absorbing means interposed in said arm.

In testimony whereof we affix our signatures.

WILLIAM JOSEPH BINGEN,
HARRY WILLARD OLSEN.